US 8,306,493 B2

(12) United States Patent
Gu

(10) Patent No.: US 8,306,493 B2
(45) Date of Patent: Nov. 6, 2012

(54) PILOT BASED ADAPTATION FOR FM RADIO RECEIVER

(75) Inventor: Yongru Gu, Lake Forest, CA (US)

(73) Assignee: Newport Media, Inc., Lake Forest, CA (US)

( * ) Notice: Subject to any disclaimer, the term of this patent is extended or adjusted under 35 U.S.C. 154(b) by 449 days.

(21) Appl. No.: 12/759,675

(22) Filed: Apr. 13, 2010

(65) Prior Publication Data

US 2011/0250859 A1 Oct. 13, 2011

(51) Int. Cl.
 *H04B 1/10* (2006.01)
 *H04B 17/00* (2006.01)
 *H04H 40/81* (2008.01)
(52) U.S. Cl. ............ 455/214; 455/67.13; 455/307; 381/11
(58) Field of Classification Search ........... 455/67.11, 455/67.13, 214, 226.1, 226.2, 226.3, 296, 455/307; 381/2, 3, 11, 12
See application file for complete search history.

(56) References Cited

U.S. PATENT DOCUMENTS

| 3,824,346 A | * | 7/1974 | Kanno et al. ............ 381/11 |
| 3,961,262 A | * | 6/1976 | Gassmann ............. 455/207 |
| 4,910,799 A | * | 3/1990 | Takayama ............ 455/296 |
| 7,133,527 B2 | * | 11/2006 | Kasperkovitz ............ 381/2 |
| 7,551,743 B1 | * | 6/2009 | Tsujishita et al. ........ 381/2 |

\* cited by examiner

*Primary Examiner* — Quochien B Vuong
(74) *Attorney, Agent, or Firm* — Rahman LLC

(57) ABSTRACT

Performing a decoding mode of a frequency modulation (FM) signal for an adaptive FM radio receiver includes passing the FM signal through a FM demodulator to obtain a composite signal that includes a pilot signal and noise around the pilot signal, passing the composite signal through a band bass filter, filtering the pilot signal from the noise using a pilot and noise separator that includes a notch filter that filters the pilot signal from the noise, obtaining average amplitudes of the pilot signal and the noise, comparing a ratio between the average amplitudes of the pilot signal and the noise with a programmable threshold, and selecting a decoding mode and an audio low pass filter. The decoding mode is selected based on a quality of the pilot signal being decoded and the audio LPF is selected based on the comparison ratio.

20 Claims, 5 Drawing Sheets

PILOT BASED ADAPTATION FOR FM RADIO RECEIVER

BACKGROUND

1. Technical Field

The embodiments herein generally relate Frequency Modulation (FM) radio receivers, and, more particularly, to a FM radio receiver with pilot based adaptation.

2. Description of the Related Art

A radio receiver is an electronic circuit that receives its input from an antenna, uses electronic filters to separate a wanted radio signal from all other signals picked up by this antenna, amplifies it to a level suitable for further processing, and finally converts the signal into a form usable for the consumer (e.g., sound) through demodulation and decoding. Frequency Modulation (FM) conveys information over a carrier wave by varying its frequency, unlike amplitude modulation, in which the amplitude of the carrier is varied while its frequency remains constant. In analog applications, the instantaneous frequency of the carrier is directly proportional to the instantaneous value of the input signal.

This form of modulation is commonly used in the FM broadcast band. It is important that stereo broadcasts should be compatible with mono receivers. For this reason, the left (L) and right (R) channels are algebraically encoded into sum (L+R) and difference (L−R) signals. A mono receiver will use just the L+R signal so the listener will hear both channels in the single loudspeaker. A stereo receiver will add the difference signal to the sum signal to recover the left channel, and subtract the difference signal from the sum to recover the right channel. Stereo FM signals are more susceptible to noise and multi path distortion than are mono FM signals. In addition, for a given RF level at the receiver, the signal-to-noise ratio for the stereo signal will generally be worse than for the mono receiver.

FIG. 1A illustrates a decoding scheme used in a traditional FM receiver with only mono reception. A FM signal 100 first passes through a FM decoder 102, which converts the FM signal 100 to a composite audio signal. Then, the composite signal is sent to an audio low pass filter (LPF) 104. The output of the audio LPF 104 is a mono L+R audio. FIG. 1B illustrates a decoding scheme used in a traditional FM receiver with only stereo reception. The FM signal 100 first goes through the FM decoder 102, which converts the FM signal 100 to a composite audio signal. Then, the composite signal is sent to a stereo decoder 106 to generate separate coarse audios for left and right ears (L, R).

Finally, the coarse L and R audios are sent to the Audio LPF 104 to get the final L and R audios or the stereo audio. FIG. 1C illustrates a simple FM adaptation scheme between mono and stereo used in a traditional FM receiver. In the FM adaptation scheme of FIG. 1C, the composite signal output from FM decoder 102 is passed through a pilot detector 108. The pilot detector 108 detects whether the pilot signal for stereo decoding is present. The outputs from the stereo decoder 106 and the pilot detector 108 are passed through a multiplexer 110 and then through the audio LPF 104. If the pilot signal is not present, only a mono reception (L+R) is performed.

If the pilot signal is present, then only a stereo reception (L, R) is performed. Thus, traditional FM radio receivers perform stereo decoding or mono decoding using the same low-pass filter for a final audio, regardless of the received signal quality. Some traditional FM radio receivers perform a simple adaptation based on the presence of pilots in the decoded signal. If the pilot is present, they perform stereo decoding while if it is not present, they perform mono decoding. Thus, there is a need for an improved pilot based adaptation technique for a FM radio receiver.

SUMMARY

In view of the foregoing, an embodiment herein provides a method of performing a decoding mode of a frequency modulation (FM) signal for an adaptive FM radio receiver. The method includes passing the FM signal through a FM demodulator to obtain a composite signal. The composite signal includes a pilot signal and noise around the pilot signal. The method further includes passing the composite signal through a band bass filter, filtering the pilot signal from the noise using a pilot and noise separator. The pilot and noise separator includes a notch filter that filters the pilot signal from the noise. Average amplitudes of the pilot signal and the noise are obtained.

A ratio between the average amplitudes of the pilot signal and the noise is compared with a programmable threshold and a decoding mode and an audio low pass filter is selected. The decoding mode is selected based on a quality of the pilot signal that is decoded. The audio low pass filter is selected based on the comparison ratio. Coarse audios are obtained from the composite signal by passing the composite signal through a stereo decoder. The coarse audios and the composite signal are multiplexed with an input of the decoding mode and the audio low pass filter that are selected.

The method further includes obtaining an audio signal based on the coarse audios and the composite signal with the input being multiplexed. The audio signal is obtained by passing the multiplexed output through the selected audio low pass filter. The audio signal is further multiplexed with the input of the decoding mode and the audio low pass filter being selected to obtain a desired signal. The pilot signal is filtered from the noise by subtracting an output of the notch filter from an input of the notch filter. The input of the notch filter includes the pilot signal and the noise.

The decoding mode is any of a mono decoding mode and a stereo decoding mode. The mono decoding mode is selected if the pilot signal is below the programmable threshold and the stereo decoding mode is selected if the pilot signal is above the programmable threshold. The average amplitude of the pilot signal is obtained by using a first power meter that includes a first leakage average filter. The average amplitude of the noise is obtained using a second power meter that includes a second leakage average filter.

The selected audio low pass filter is any of a narrow band noise filter and a wide band filter. The narrow band noise filter is selected if a channel is a noisy channel, and the wide band filter is selected if the channel is a clean channel.

In another aspect, an adaptive frequency modulation (FM) radio receiver for performing a decoding mode of an FM signal is provided. The FM radio receiver includes a FM demodulator unit that demodulates the FM signal to a composite signal that includes a pilot signal and noise, a pilot quality monitor unit including a band pass filter unit that passes the pilot signal and the noise, a pilot and noise separation unit that includes a notch filter that separates the pilot signal from the noise, a first power meter that includes a first leakage average filter that averages an amplitude of the pilot signal, a second power meter that includes a second leakage average filter that averages an amplitude of the noise, and a decoding mode and filter selection unit that compares the ratio between the average amplitude of the pilot signal and the average amplitude of the noise with a programmable threshold.

A stereo decoding unit that separates the composite signal to coarse audios. A first multiplexer that multiplexes the coarse audios and the composite signal with an output from the decoding mode and filter selection unit. A plurality of audio low pass filters. At least one audio low pass filter is selected from the plurality of audio low pass filters based on a comparison ratio. The selected audio low pass filter filters an output from the multiplexer to obtain an audio signal. The selected audio low pass filter is any of a narrow band low pass filter and a wide band low pass filter.

The decoding mode and filter selection unit selects a decoding mode based on a quality of the pilot signal being decoded. A second multiplexer that multiplexes the audio signal with an output from the decoding mode and filter selection unit to obtain a desired audio signal. The decoding mode is at least one of a mono decoding mode and a stereo decoding mode. The mono decoding mode is selected if the pilot signal is below the programmable threshold, and the stereo decoding mode is selected if the pilot signal is above the programmable threshold. The narrow band noise filter is selected if a channel is a noisy channel, and the wide band filter is selected if the channel is a clean channel.

In yet another aspect, a system for performing a decoding mode of an FM signal for an adaptive FM radio receiver is provided. The system includes means for demodulating the FM signal to obtain a composite signal that includes a pilot signal and noise around the pilot signal, means for filtering the pilot signal and the noise, means for averaging an amplitude of the pilot signal, means for averaging an amplitude of the noise, means for comparing a ratio between the average amplitude of the pilot signal and the average amplitude of the noise with a programmable threshold, means for selecting a decoding mode and an audio low pass filter (LPF), means for obtaining coarse audios from the composite signal, means for multiplexing the coarse audios, the composite signal with an input of the decoding mode and the audio low pass filter being selected, means for obtaining an audio signal by passing an output of the means for multiplexing through the selected audio low pass filter, and means for multiplexing the audio signal with the input of the decoding mode and the audio low pass filter being selected.

The pilot signal and the noise are passed through a band pass filter. The decoding mode is selected based on a quality of the pilot signal that is decoded. The audio low pass filter is selected from a plurality of audio LPF's based on the ratio that is compared. The amplitude of the pilot signal is averaged using a first power meter that includes a first leakage average filter. The amplitude of the noise is averaged using a second power meter that includes a second first leakage average filter.

The ratio between the average amplitude of the pilot signal and the average amplitude of the noise are compared with the programmable threshold using a decoding mode and filter selection unit. A desired audio signal is obtained by multiplexing the audio signal with the input of the decoding mode and the audio low pass filter being selected. The coarse audios are obtained using a stereo decoding unit and the pilot signal is separated from the noise using a pilot and noise separation unit.

The decoding mode is any of a mono decoding mode and a stereo decoding mode. The selected audio low pass filter is any of a narrow band noise filter and a wide band filter. The mono decoding mode is selected if the pilot signal is below the programmable threshold. The stereo decoding mode is selected if the pilot signal is above the programmable threshold. The narrow band noise filter is selected if a channel is a noisy channel. The wide band filter is selected if the channel is a clean channel.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1A:
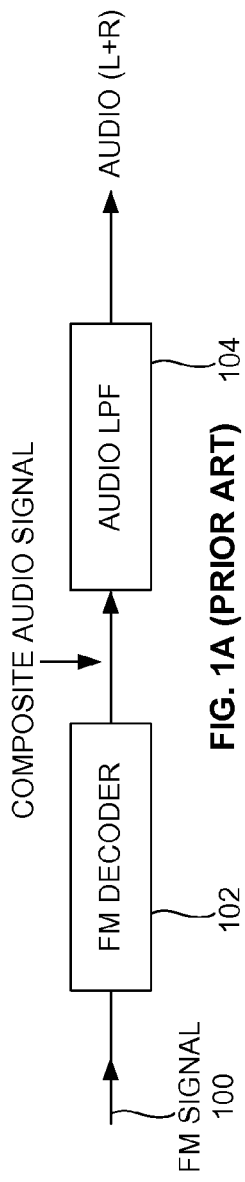
FIG. 1A illustrates a decoding scheme used in a traditional FM receiver with only mono reception.
Figure 1B:
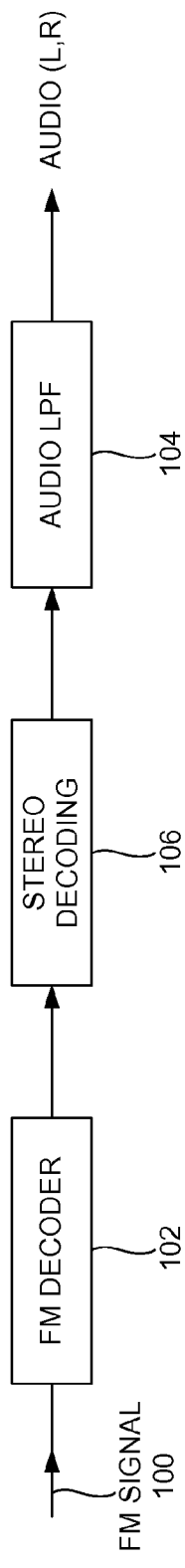
FIG. 1B illustrates a decoding scheme used in a traditional FM receiver with only stereo reception.
Figure 1C:
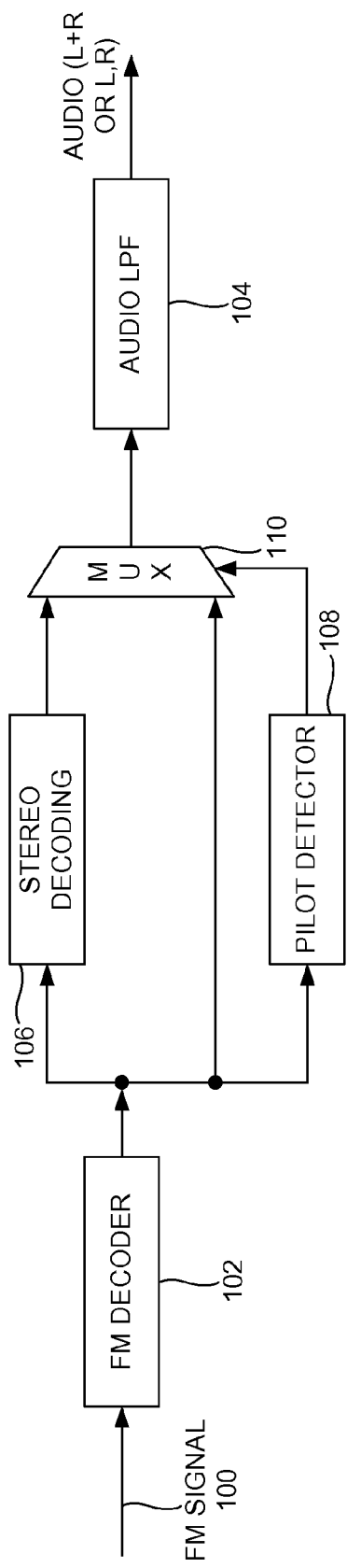
FIG. 1C illustrates a simple FM adaptation scheme between mono and stereo used in a traditional FM receiver.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need of an improved pilot based adaptation technique for a FM radio receiver. The embodiments herein achieve this by providing a pilot quality monitor unit that includes a notch filter unit which removes and/or separates the pilot signal from the noise and passes to the first power meter and the second power meter. The first power meter and the second power meter include a first leakage filter and a second leakage filter that performs average amplitude of the pilot signal and the noise. The decoding mode and filter selection unit compares the average amplitude of the pilot signal and the noise to determine which audio low pass filter to be used. The decoding mode is selected based on the quality of decoded pilot signals. Referring now to the drawings, and more particularly to FIGS. 2 through 5, where similar reference characters denote corresponding features consistently throughout the figures, there are shown preferred embodiments.

Figure 2:
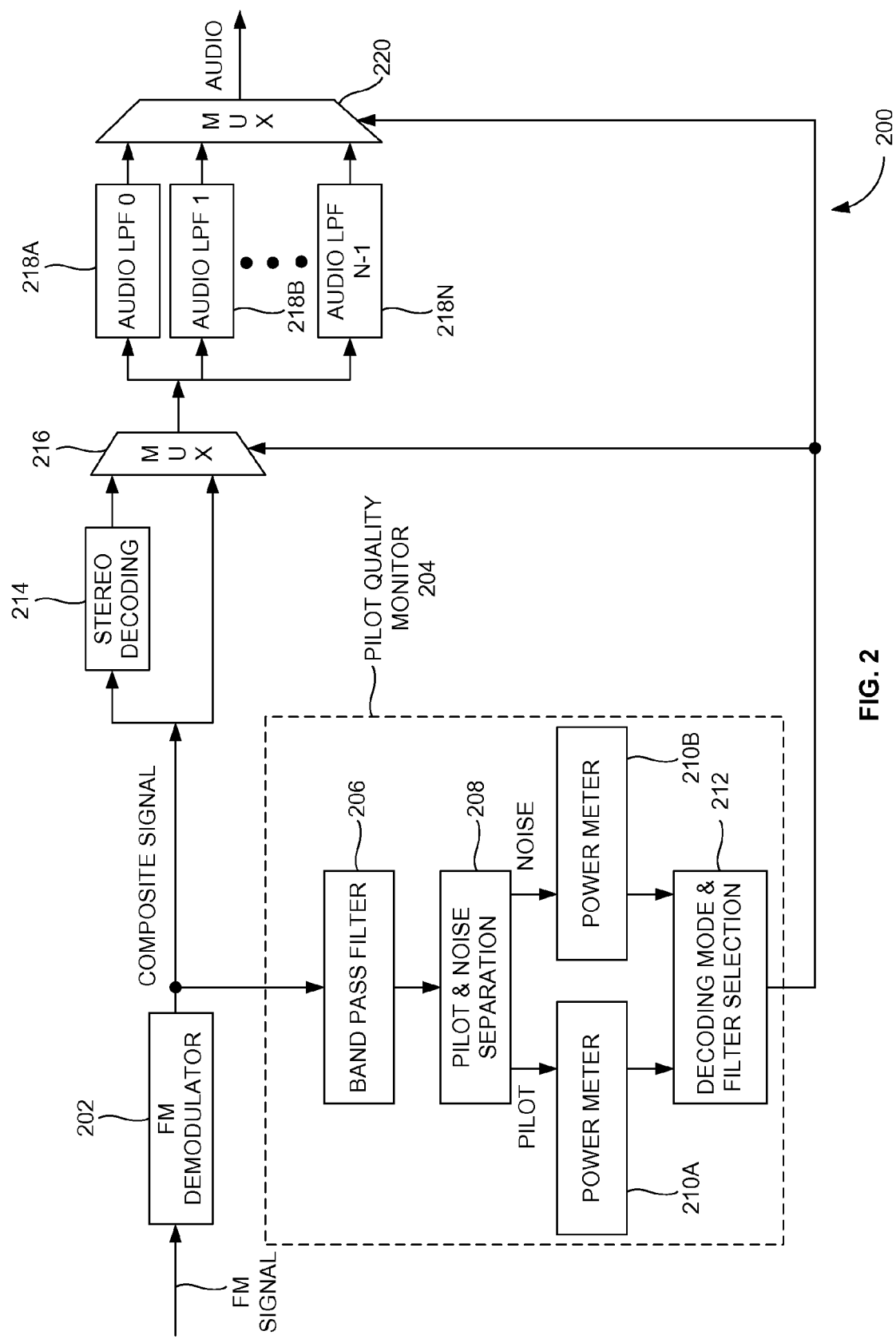
FIG. 2 illustrates a block diagram of an adaptive FM radio reception according to an embodiment herein.

FIG. 2 illustrates a block diagram of an adaptive FM radio reception apparatus 200 according to an embodiment herein. The block diagram of the adaptive FM radio reception apparatus 200 includes a FM demodulator unit 202, a pilot quality monitor unit 204, a stereo decoding unit 214, a first multiplexer 216, a plurality of audio low pass filters (LPF's) 218A-N, and a second multiplexer 220 according to an embodiment herein. The pilot quality monitor unit 204 includes a band pass filter unit 206, a pilot and noise separation unit 208, a first power meter 210A and a second power meter 210B, and a decoding mode and filter selection unit 212.

A FM signal is fed as an input to the FM demodulator unit 202. The FM demodulator unit 202 demodulates the FM signal 200 into a composite signal. The composite signal is then fed to the band pass filter unit 206. The band pass filter 206 allows only the pilot signal and a noise around the pilot signal to pass through the band pass filter unit 206. The pilot and noise separation unit 208 receives the pilot signal and the noise. The pilot and noise separation unit 208 includes a notch filter unit (not shown in FIG. 2). The input (pilot signal and noise) passes through the notch filter which in turn removes and/or separates the pilot signal from the noise. The pilot signal is obtained by subtracting the output of the notch filter from the input of the notch filter.

The output of the notch filter is a separation of the pilot signal from the noise. The first power meter unit 210A receives the pilot signal (e.g., noise separated). The second power meter unit 210B receives the noise. In one embodiment, the first power meter unit 210A includes a first leakage average filter (not shown in FIG. 2) and the second power meter unit 210B includes a second leakage average filter (not shown in FIG. 2). The first leakage average filter of the first power meter unit 210A and the second leakage average filter of the second power meter unit 210B perform average amplitude of the pilot signal and the noise. In one embodiment, the first leakage average filter and the second average leakage filter update their outputs on receiving a new amplitude sample of pilot or noise. The leakage average factor is programmable and is selected based on the audio reception testing.

The average amplitudes of the pilot signal and the noise are sent to the decoding mode and filter selection unit 212. The decoding mode and filter selection unit 212 compares the ratio between the average amplitude of the pilot signal and the average amplitude of the noise with a programmable threshold set to determine which audio low pass filter is to be used among the plurality of audio low pass filters 218A-N. When noise is high, the using a narrower audio low pass filter 218A-N helps reduce more noise, and helps reduce the audio bandwidth so high frequency audio cannot pass. Therefore, when noise is low and noise is not a concern, a wide audio low pass filter can be used to hear the high frequency audio, such as music. The decoding mode and filter selection unit 212 also compares the amplitude of the pilot signal with a programmable threshold. In one embodiment, if the amplitude of the pilot signal is below the programmable threshold, then a mono decoding mode is selected. In another embodiment, if the amplitude of the pilot signal is above the programmable threshold, then a stereo decoding mode is selected. The decoding mode is selected based on the quality of the decoded pilot signals. The stereo decoding unit 214 outputs coarse audios for left and right ears on the composite signal fed as an input. The first multiplexer 216 multiplexes the coarse audios, the composited signal and the output from the pilot quality monitor unit 204.

The plurality of audio low pass filter 218A-N is any of a narrow band filter, or a wider band filter. One of the audio LPF from the plurality of audio LPF's 218A-N is selected is based on the comparison ratio between the average amplitude of the pilot and the average amplitude of the noise with the programmable threshold. The output from the first multiplexer 216 passes through the selected audio LPF from the plurality of audio LPF's to obtain an audio signal.

In one embodiment, the narrow band filter is selected if a channel is a noisy channel such that it can reject more noise to improve the quality of audio. In another embodiment, the wider band filter is selected if a channel is a clean channel (e.g., channel having many high-frequency components in the audio). The second multiplexer 220 receives an output from the selected low pass filter from the plurality of LPF's 218A-N and subsequently receives the output from the pilot quality monitor unit 204. The second multiplexer 220 multiplexes the output received from the selected low pass filter from the plurality of LPF's 218A-N with the output received from the pilot quality monitor unit 204 to obtain a desired audio signal.

Figure 3:
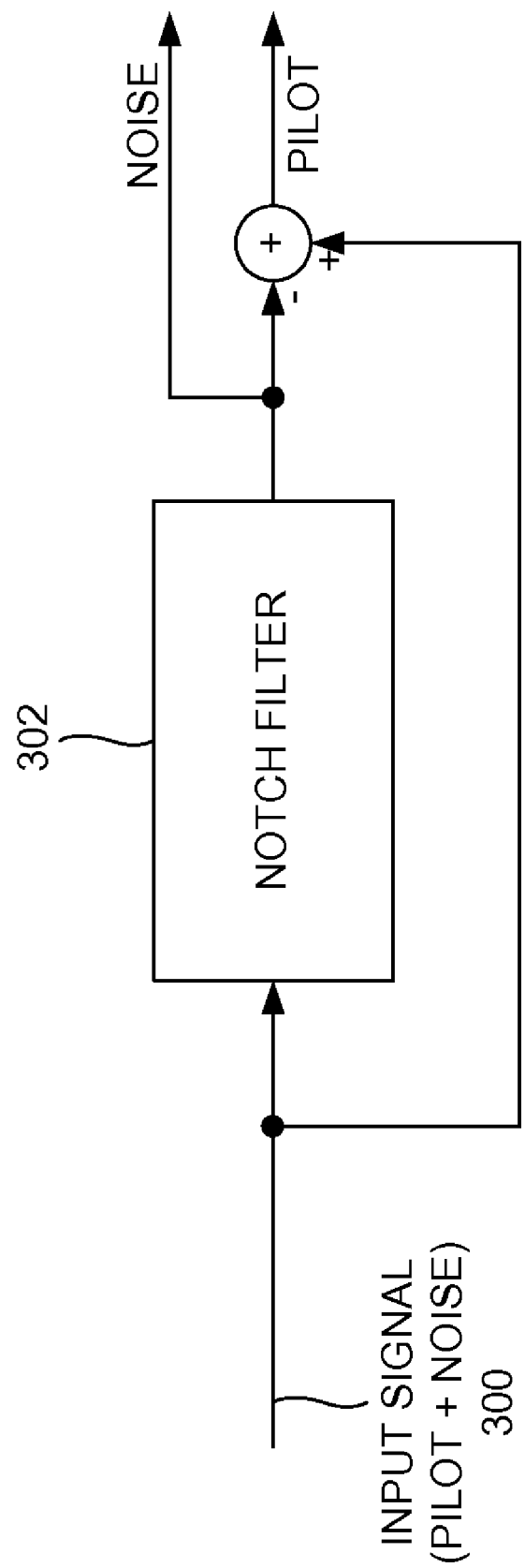
FIG. 3 illustrates an exploded view of the pilot and noise separation unit of the pilot quality monitor unit of FIG. 2 according to an embodiment herein.

FIG. 3 illustrates an exploded view of the pilot and noise separation unit 208 of the pilot quality monitor unit 204 of FIG. 2 according to an embodiment herein. The pilot and noise separation unit 208 includes a notch filter 302. The notch filter 302 receives an input signal 300 (pilot signal+noise) which in turn removes and/or separates the pilot signal from the noise. The pilot signal is obtained by subtracting the output of the notch filter from the input of the notch filter. The output of the notch filter is a separation of the pilot signal from the noise as shown in FIG. 3.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can comprise hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 4:
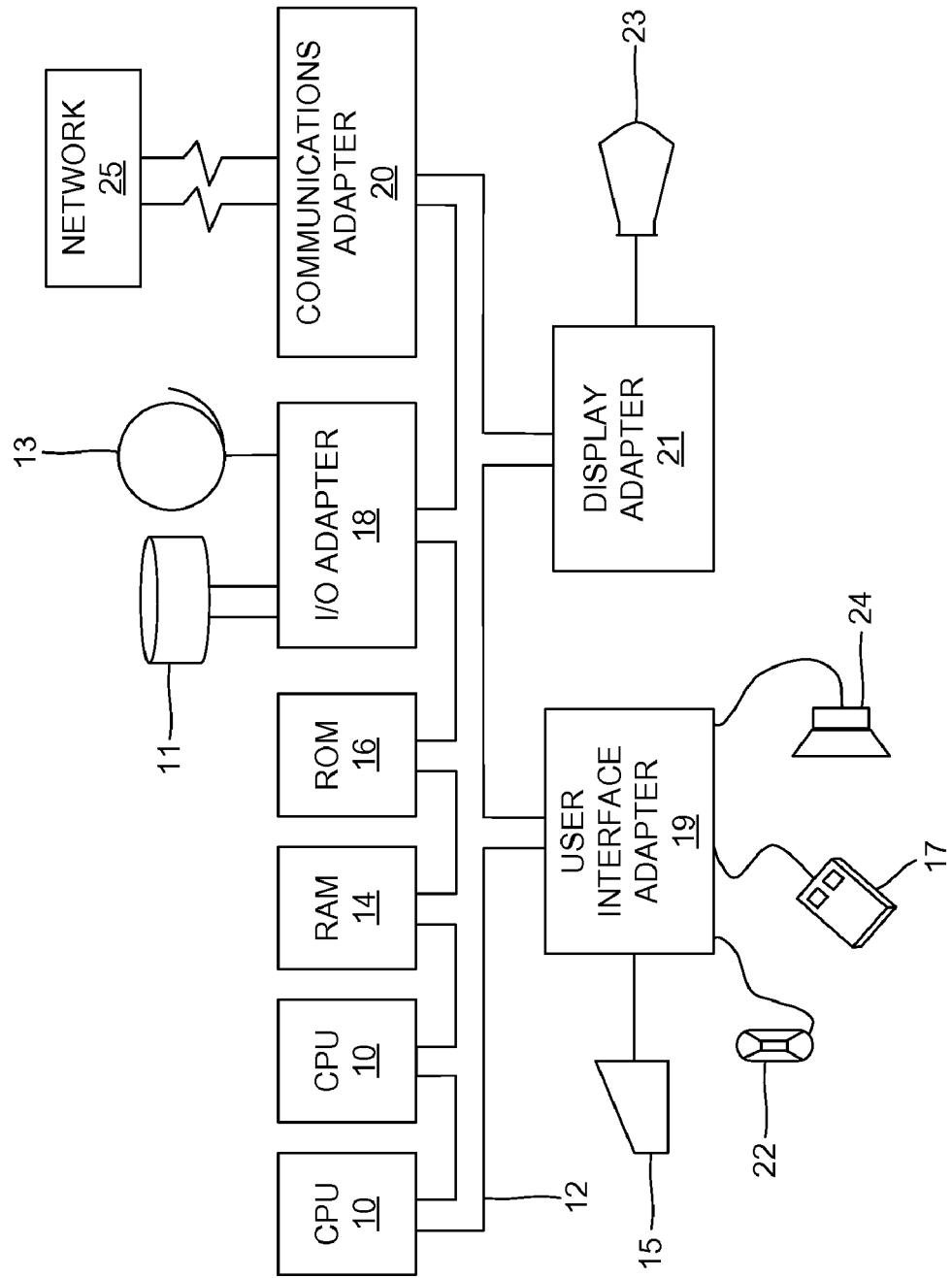
FIG. 4 illustrates a schematic diagram of a computer architecture used in accordance with the embodiments herein.

A representative hardware environment for practicing the embodiments herein is depicted in FIG. 4. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Figure 5:
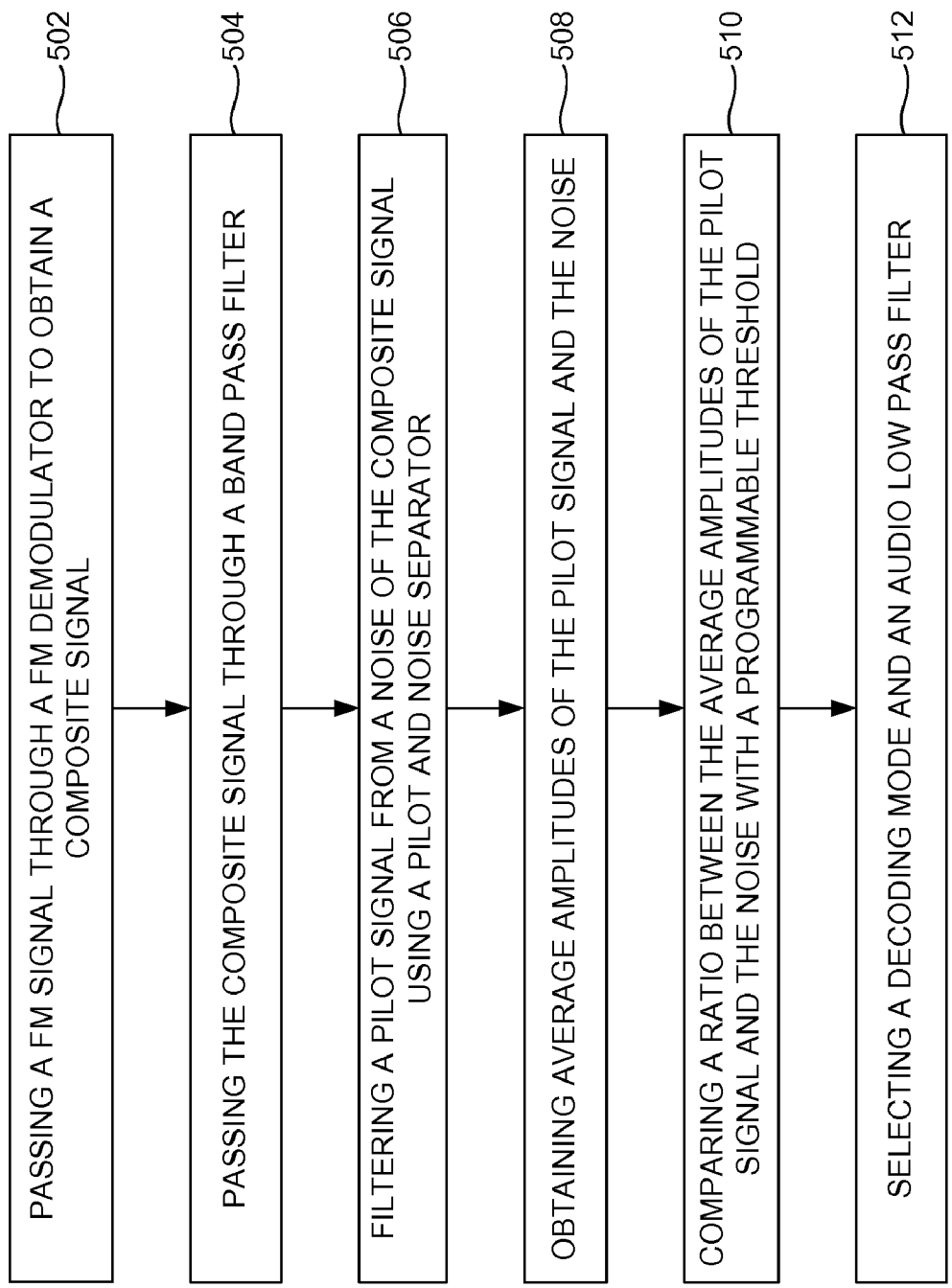
FIG. 5 is a flow diagram illustrating a method of performing a decoding mode of a frequency modulation (FM) signal for an adaptive FM radio receiver according to an embodiment herein.

FIG. 5, with reference to FIGS. 2 through 4, is a flow diagram illustrating a method of performing a decoding mode of a frequency modulation (FM) signal for an adaptive FM radio receiver 200 according to an embodiment herein. In step 502, the FM signal is passed through a FM demodulator 202 to obtain a composite signal. The composite signal includes a pilot signal and noise around the pilot signal. In step 504, the composite signal is passed through a band bass filter 206. In step 506, the pilot signal is filtered from the noise using a pilot and noise separator 208. The pilot and noise separator 208 includes a notch filter 302 that filters the pilot signal from the noise. In step 508, average amplitudes of the pilot signal and the noise are obtained. The average amplitude of the pilot signal is obtained by using a first power meter 210A that includes a first leakage average filter (not shown) and the average amplitude of the noise is obtained using a second power meter 210B that includes a second leakage average filter (not shown). In step 510, a ratio between the average amplitudes of the pilot signal and the noise is compared with a programmable threshold.

In step 512, a decoding mode and an audio low pass filter is selected. The decoding mode is selected based on a quality of the pilot signal that is decoded, and the audio low pass filter 218A-N is selected based on the comparison ratio. The selected audio low pass filter 218A-N is any of a narrow band noise filter and a wide band filter. The narrow band noise filter is selected if a channel is a noisy channel, and the wide band filter is selected if the channel is a clean channel.

The method further includes obtaining coarse audios from the composite signal by passing the composite signal through a stereo decoder 214. The coarse audios and the composite signal are multiplexed with an input of the decoding mode and the audio low pass filter 218A-N that is selected. An audio signal is obtained based on the coarse audios and the composite signal with the input that is multiplexed by passing the multiplexed output through the selected audio low pass filter 218A-218N. The audio signal is further multiplexed with the input of the decoding mode and the audio low pass filter 218A-N that is selected to obtain a desired signal.

The pilot signal is filtered from the noise by subtracting an output of the notch filter from an input of the notch filter 302. The input of the notch filter 302 includes the pilot signal and the noise. The decoding mode is at least one of a mono decoding mode and a stereo decoding mode. The mono decoding mode is selected if the pilot signal is below the programmable threshold, and the stereo decoding mode is selected if the pilot signal is above the programmable threshold.

The pilot quality monitor unit 204 includes the notch filter unit 302 that removes the pilot signal from the noise and passes to the first power meter 210A and the second power meter 210B. The first power meter and the second power meter include a first leakage filter and a second leakage filter (not shown) that determines an average amplitude of the pilot signal and the noise. The decoding mode and filter selection unit 212 compares the average amplitude of the pilot signal and the noise to determine which audio low pass filter 218A-N is to be used.

The decoding mode (e.g., mono decoding mode or the stereo decoding mode) is selected based on the quality of decoded pilot signals. The output from the decoding mode and filter selection unit 212 is multiplexed with the coarse audios, and the composite signal. The multiplexed output is passed through the selected LPF from the plurality of LPFs 218A-N to obtain an audio signal. The audio signal is further multiplexed with the output from the decoding mode and filter selection unit 212 to obtain a desired audio signal. The embodiments herein may be used in an analog configuration.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method of performing a decoding mode of a frequency modulation (FM) signal for an adaptive FM radio receiver, said method comprising:
    passing said FM signal through a FM demodulator to obtain a composite signal, wherein said composite signal comprises a pilot signal and noise around said pilot signal;
    passing said composite signal through a band bass filter;
    filtering said pilot signal from said noise using a pilot and noise separator, said pilot and noise separator comprising a notch filter, wherein said notch filter filters said pilot signal from said noise;
    obtaining average amplitudes of said pilot signal and said noise;
    comparing a ratio between said average amplitudes of said pilot signal and said noise with a programmable threshold; and
    selecting a decoding mode and an audio low pass filter, wherein said decoding mode is selected based on a quality of said pilot signal being decoded, and said audio low pass filter is selected based on the comparison ratio.

2. The method of claim 1, further comprising obtaining coarse audios from said composite signal, wherein said coarse audio is obtained by passing said composite signal through a stereo decoder.

3. The method of claim 1, further comprising multiplexing said coarse audios and said composite signal with an input of said decoding mode and said audio low pass filter being selected.

4. The method of claim 3, further comprising:
    obtaining an audio signal based on said coarse audios and said composite signal with said input being multiplexed, wherein said audio signal is obtained by passing said multiplexed output through said selected audio low pass filter; and
    multiplexing said audio signal with said input of said decoding mode and said audio low pass filter being selected to obtain a desired signal.

5. The method of claim 1, wherein said pilot signal is filtered from said noise by subtracting an output of said notch filter from an input of said notch filter, wherein said input of said notch filter comprises said pilot signal and said noise.

6. The method of claim 1, wherein said decoding mode comprises at least one of a mono decoding mode and a stereo decoding mode, wherein said mono decoding mode is selected if said pilot signal is below said programmable threshold, and wherein said stereo decoding mode is selected if said pilot signal is above said programmable threshold.

7. The method of claim 1, wherein said average amplitude of said pilot signal is obtained by using a first power meter, said first power meter comprising a first leakage average filter, and said average amplitude of said noise is obtained using a second power meter, said second power meter comprising a second leakage average filter.

8. The method of claim 1, wherein said selected audio low pass filter comprises at least one of a narrow band noise filter and a wide band filter, wherein said narrow band noise filter is selected if a channel is a noisy channel, and wherein said wide band filter is selected if said channel is a clean channel.

9. An adaptive frequency modulation (FM) radio receiver for performing a decoding mode of an FM signal, said FM radio receiver comprising:
    a FM demodulator unit that demodulates said FM signal to a composite signal, said composite signal comprising a pilot signal and noise;
    a pilot quality monitor unit comprising:
        a band pass filter unit that passes said pilot signal and said noise;
        a pilot and noise separation unit comprising a notch filter that separates said pilot signal from said noise;
        a first power meter comprising a first leakage average filter that averages an amplitude of said pilot signal;
        a second power meter comprising a second leakage average filter that averages an amplitude of said noise; and
        a decoding mode and filter selection unit that compares the ratio between the average amplitude of said pilot signal and the average amplitude of said noise with a programmable threshold;
    a stereo decoding unit that separates said composite signal to coarse audios;
    a first multiplexer that multiplexes said coarse audios and said composite signal with an output from said decoding mode and filter selection unit; and
    a plurality of audio low pass filters, wherein at least one audio low pass filter is selected from said plurality of audio low pass filters based on a comparison ratio, said selected audio low pass filter filtering an output from said multiplexer to obtain an audio signal, wherein said selected audio low pass filter comprises at least one of a narrow band low pass filter and a wide band low pass filter,
    wherein said decoding mode and filter selection unit selects a decoding mode based on a quality of said pilot signal being decoded; and
    a second multiplexer that multiplexes said audio signal with an output from said decoding mode and filter selection unit to obtain a desired audio signal.

10. The FM radio receiver of claim 9, wherein said decoding mode comprises at least one of a mono decoding mode and a stereo decoding mode.

11. The FM radio receiver of claim 10, wherein said mono decoding mode is selected if said pilot signal is below said programmable threshold, and said stereo decoding mode is selected if said pilot signal is above said programmable threshold.

12. The FM radio receiver of claim 9, wherein said narrow band noise filter is selected if a channel is a noisy channel, and said wide band filter is selected if said channel is a clean channel.

13. A system for performing a decoding mode of an FM signal for an adaptive FM radio receiver, said system comprising:
    means for demodulating said FM signal to obtain a composite signal, wherein said composite signal comprises a pilot signal and noise around said pilot signal;
    means for filtering said pilot signal and said noise;
    means for averaging an amplitude of said pilot signal;
    means for averaging an amplitude of said noise;
    means for comparing a ratio between said average amplitude of said pilot signal and said average amplitude of said noise with a programmable threshold;
    means for selecting a decoding mode and an audio low pass filter (LPF), means for obtaining coarse audios from said composite signal, means for multiplexing said coarse audios, said composite signal with an input of said decoding mode and said audio low pass filter being selected;

means for obtaining an audio signal by passing an output of said means for multiplexing through said selected audio low pass filter; and means for multiplexing said audio signal with said input of said decoding mode and said audio low pass filter being selected, wherein said pilot signal and said noise is passed through a band pass filter, wherein said decoding mode is selected based on a quality of said pilot signal being decoded, wherein said audio low pass filter is selected from a plurality of audio LPF's based on said ratio being compared, wherein said amplitude of said pilot signal is averaged using a first power meter, said first power meter comprises a first leakage average filter, wherein said amplitude of said noise is averaged using a second power meter, said second power meter comprises a second first leakage average filter, wherein said ratio between said average amplitude of said pilot signal and said average amplitude of said noise are compared with said programmable threshold using a decoding mode and filter selection unit, and wherein a desired audio signal is obtained on said audio signal multiplexed with said input of said decoding mode and said audio low pass filter being selected.

14. The system of claim 13, wherein said coarse audios is obtained using a stereo decoding unit, and said pilot signal is separated from said noise using a pilot and noise separation unit.

15. The system of claim 13, wherein said decoding mode comprises at least one of a mono decoding mode and a stereo decoding mode.

16. The system of claim 15, wherein said mono decoding mode is selected if said pilot signal is below said programmable threshold.

17. The system of claim 15, wherein said stereo decoding mode is selected if said pilot signal is above said programmable threshold.

18. The system of claim 13, wherein said selected audio low pass filter comprises at least one of a narrow band noise filter and a wide band filter.

19. The system of claim 18, wherein said narrow band noise filter is selected if a channel is a noisy channel.

20. The system of claim 18, wherein said wide band filter is selected if said channel is a clean channel.

* * * * *